Nov. 25, 1958    P. S. NISSENSON ET AL    2,862,163
SELF-SYNCHRONOUS SERVOSYSTEM FOR TELEMETERING
Filed March 4, 1957    3 Sheets-Sheet 1

WITNESSES:
Donald Smith
Bernard R. Gieguey

INVENTORS
Phineas S. Nissenson and
John Mazur.
BY
Arthur 7. Stretton
ATTORNEY

United States Patent Office 2,862,163
Patented Nov. 25, 1958

2,862,163

SELF-SYNCHRONOUS SERVOSYSTEM FOR TELEMETERING

Phineas S. Nissenson, Whitehall Boro, and John Mazur, Elizabeth, Pa., assignors to Westinghouse Electric Corporation, East Pittsburgh, Pa., a corporation of Pennsylvania Application March 4, 1957, Serial No. 643,817

13 Claims. (Cl. 318—24)

The present invention relates to signal transmitting and receiving systems and more particularly to such a system arranged for use in conjunction with a hermetically sealed system.

A telemetering system of the character described finds application in those situations wherein it is desired to measure a given characteristic by transferring the characteristic into proportional rotary movement of a rotor of a dynamoelectric machine serving as a transmitter for the system. The transmitter or generator is coupled to a suitable receiver or motor likewise constructed in the form of a dynamoelectric device and in which the stator thereof is coupled to the stator of the transmitter in a manner that the receiving rotor will be driven in synchronization with the transmitting rotor.

Prior telemetering systems of the character described frequently have utilized wound rotors to which an alternating current is supplied. Usage of the wound rotor renders the telemetering system unsuitable for use within a sealed system largely because of the difficulty in adequately sealing the leads required for the rotor winding. Furthermore, the use of a wound rotor or even a conventional salient pole rotor in the telemetering receiver in many instances causes the receiver to "run away," that is to say, to act as an induction motor with the result that the receiving rotor no longer can be maintained in synchronization with the transmitting rotor.

In addition to these disadvantages, the employment of wound rotors necessitated providing additional electrical connections between the synchro-transmitter and the synchro-receiver and, furthermore, required the use of brushes, slip rings and other associated parts, all of which are rather subject to wear and are difficult to replace, particularly when the transmitter is utilized in conjunction with a hermetically sealed system.

Because of the electrical circuit arrangements of prior transmitters and receivers used in hermetically sealed systems, a continuous flow of current between the transmitter and receiver is maintained while the telemetering system is being utilized. The current thus flowing therebetween frequently results in overheating the transmitter or the receiver or requires usage of larger units than otherwise would be required due to the necessarily added thermal capacity of the transmitter or the receiver.

In view of the foregoing, an object of the invention is to provide a novel and efficient telemetering system having a minimum of component parts.

Another object of the invention is to provide a telemetering system employing windingless rotors particularly adapted for more efficient use in connection with a hermetically sealed system.

A further object of the invention is to provide a novel and efficient receiver adapted for use in the aforesaid telemetering system in which a greater amount of torque developed therein tends to maintain the rotor of the receiver in a position of synchronism with a transmitting rotor which in one application of the invention is located in a hermetically sealed system.

Still another object of the invention is to provide more efficient means in a telemetering device for coupling the receiver and transmitter of a telemetering system to external circuitry.

Still another object of the invention is to provide in a telemetering device means for inhibiting the device from acting as an induction motor under certain operating conditions of the telemetering system.

A still further object of the invention is to provide means in a telemetering device for facilitating bridging the magnetic gaps of the device when the rotor thereof is hermetically sealed within a given system.

Yet another object of the invention is to provide means for preventing overrun of the rotor of a telemetering device when the transmitting rotor is suddenly halted.

Still another object of the invention is to provide an electric motor possessing a high torque characteristic and a novel generating device therefor.

These and other objects, features and advantages of the invention will be made apparent during the ensuing description of illustrative embodiments thereof, with the description being taken in conjunction with the accompanying drawings wherein.

Within the contemplation of the invention, a synchrotransmitter is provided with a windingless rotor which in one application of the invention is "canned" or sealed for insertion into a hermetically sealed system. Means are associated with the sealed enclosure of the rotor for increasing the magnetic fluxile density in the magnetic circuit of the synchro-transmitter by reducing the reluctance of the sealed enclosure. The synchro-transmitting stator is formed from a plurality of E-cores disposed about the periphery of the rotor and adapted to function in association with the rotor as determined by the position thereof for transmitting a controlling signal to a suitable synchro-receiver. The signal thus generated by the transmitter is adapted for operating a conventional synchro-receiver or alternatively can be fed to the synchro-receiver disclosed herein and similar in construction to that of the transmitting unit of the invention.

Figure 1:
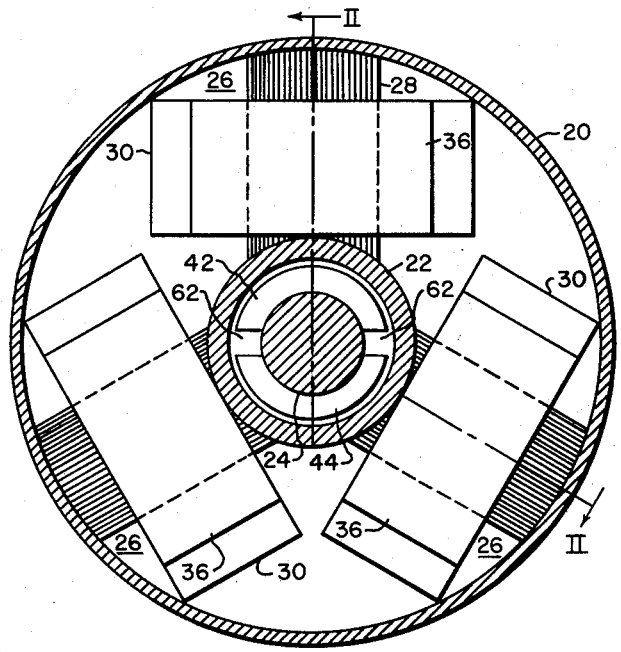
Figure 1 is a transverse sectional view of a synchrotransmitter constructed according to the principles of the invention.
Figure 2:
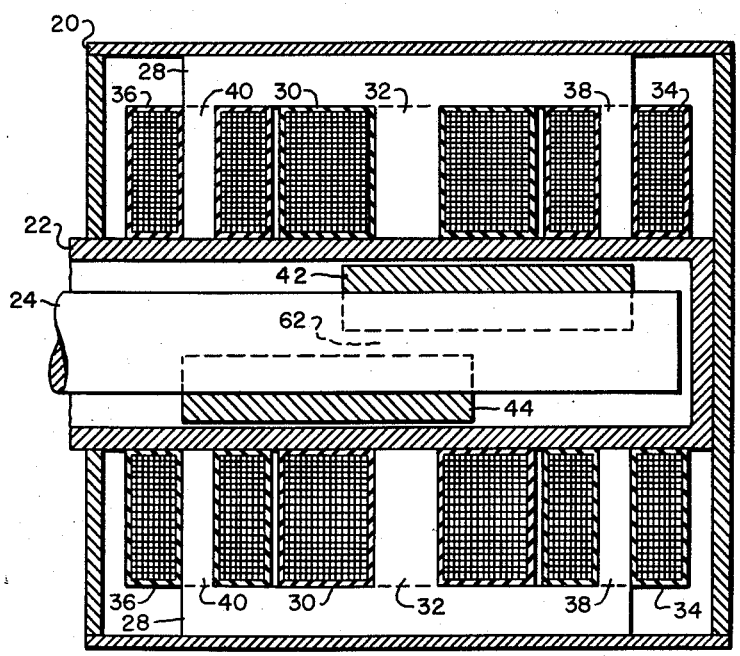
Fig. 2 is a longitudinally sectional view taken along lines II–II of Fig. 1.

Referring now more particularly to Figs. 1 and 2 of the drawings, the exemplary construction of the synchrotransmitter depicted therein comprises a housing 20 mounted, in this example, upon a sealed rotor enclosure 22. Inserted into the enclosure 22 and mounted for movement therewithin is a transmitting rotor 24, which is coupled through suitable well-known mechanical linkage (not shown) to a device whose position or other condition thereof is to be transformed into an electrical signal by the synchro-transmitter in a manner presently to be described.

Secured within the housing 20 are a plurality of transformers 26 having the cores thereof secured to the housing 20 and engaging the rotor enclosure 22, which in this example of the invention is fabricated from a non-magnetic material. Each of the transformers 26, with three being utilized in this example of the invention for purposes which will be pointed out hereinafter, includes mounted on the central leg or pole 32 of the E-core 28 an E-shaped laminated core 28, a primary coil 30 and secondary coils 34 and 36 mounted on the outer legs or poles 38 and 40, respectively, of the core 28. For selectively bridging the magnetic gaps between the E-core transformer legs 38 and 32, 32 and 40, a pair of salient poles 42 and 44 are formed on the rotor 24. The poles 42 and 44 are fabricated from a magnetic material, such as magnetic stainless steel, while the rotor 24 is formed of a suitable non-magnetic material. The poles 42 and 44 are displaced radially 180° of the rotor 24 and are displaced further axially along the rotor 24 in order that the poles 42 and 44 will lie adjacent the gaps between the transformer legs 32 and 38, 32 and 40, respectively, as the rotor with the poles 42 and 44 is rotated.

When the synchro-transmitting rotor 24 and its associated sealed enclosure 22 is utilized in conjunction with highly pressurized fluid systems, means are provided in association with the sealed enclosure 22 in order to reduce the detrimental effects upon the magnetic circuit of the synchro-transmitter, resulting from the necessarily increased thickness of the sealed enclosure 22 and the resultant increase in the physical length of the magnetic gaps. Such means operates effectively to extend the legs 32, 38 and 40 of each of the transformer cores 28 through the cylindrical walls of the sealed enclosure 22. With this arrangement the rotational signal transmitted by the synchro-transmitter is not substantially diminished in amplitude by increasing the thickness of the sealed enclosure.

Figure 3:
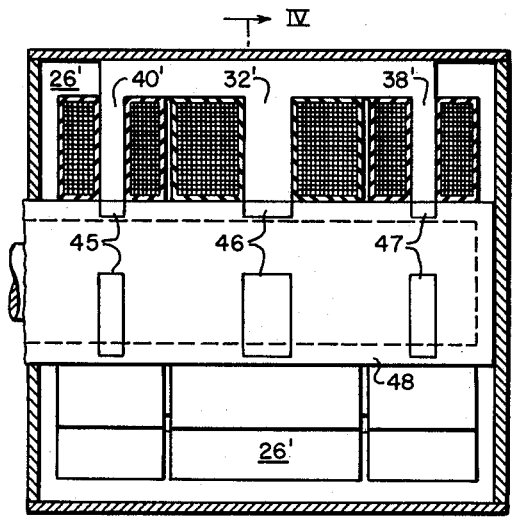
Fig. 3 is an elevational view partially sectioned of another form of synchrono-transmitter adapted here for use in conjunction with a sealed system, parts being removed and other parts being broken away for clarity.
Figure 4:
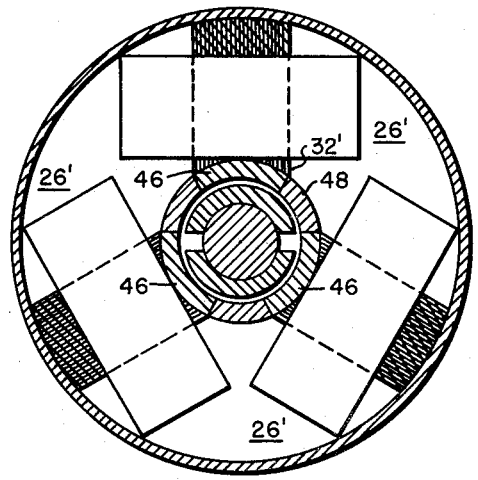
Fig. 4 is a transverse sectional view taken generally along lines IV–IV of Fig. 3 with the primary windings thereof being shown in elevation.
Figure 9:
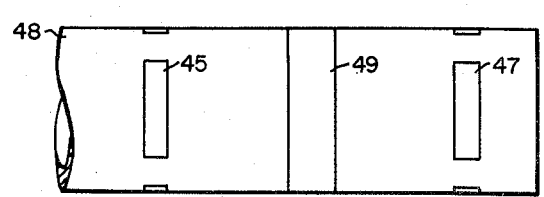
Fig. 9 is an elevational view of another form of the sealed rotor enclosure illustrated in Fig. 3 and constructed according to the invention.

Referring now to Figs. 3 and 4 of the drawings, one form of such magnetic gap diminishing means includes the provision of a number of magnetic inserts 45, 46 and 47 about the periphery of the non-magnetic rotor enclosure 48. The number of inserts in each of the groups 45, 46 and 47 is made equal to the number of transformers 26', with three being utilized in this example of the invention. The inserts 45, 46 and 47 are disposed, respectively, adjacent the inwardly facing ends of the transformer core legs 40', 32' and 38' and in this example are coextensive with the surface thereof. Alternatively, as shown in Fig. 9, the central inserts 46 (Fig. 3) can be provided in the form of a magnetic continuous ring member 49 coupled into the non-magnetic enclosure 48. Thus the individual magnetic gaps of the transformers 26' are determinable adequately by the individual inserts 45 and 47. Obviously, the sealed rotor enclosures 22 or 48 can be omitted in those applications wherein the synchro-transmitter is not intended for use within a sealed system.

Figure 5:
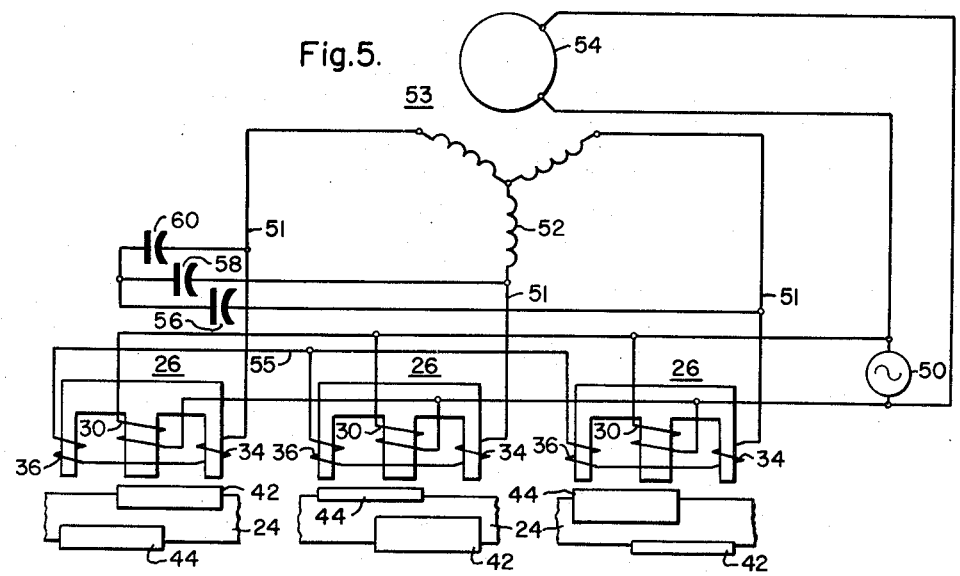
Fig. 5 is a schematic circuit diagram of one form of synchro-telemetering system arranged according to the invention, with the broken rotor portions showing the positional variations of the rotor poles relative to each one of the E-core transformers comprising the stator thereof.

As shown in Fig. 5 of the drawings, the primaries 30 of each of the transformers 26 are connected to a suitable source of alternating potential 50, while the secondaries 34 and 36 of each of the transformers 26 are connected in series-opposition with one another. The interconnected secondary coils 34 annd 36 are then combined into a conventional Y-network, as represented by the lines 51 and the common conductor 55, for connection to the stator 52 of a suitable synchro-receiving mechanism, indicated generally by the reference character 53, and having in this example a wound rotor 54 connected to the alternating voltage source 50. To counteract the inductive loading of the telemetering system of Fig. 5, condensers 56, 58 and 60 are connected in a Y-arrangement across the outputs 51 of the secondary coils 36 and 34.

As the rotor 24 (Figs. 1 and 2) is rotated, the salient pole 42 successively bridges the gaps in the magnetic circuit between the primary coil 30 and the secondary coil 34 of each of the transformers 26. In a similar manner but 180° out of phase with the pole 42, the salient pole 44 bridges the gaps in the magnetic circuit between the primary coil 30 and the secondary coil 36 of each of the transformers 26. Since the secondary coils 34 and 36 are connected in series-opposition one to another, the voltages induced therein when the aforesaid gaps are bridged will be opposite in sense. Thus when the salient pole 42 is arranged symmetrically adjacent the legs 32 and 38 of a given transformer 26, the voltage induced in the secondary coil 34 thereof will be at a maximum in one direction and when the salient pole 44 is arranged symmetrically adjacent, upon further rotation of the rotor 24, the legs 32 and 40 of one of the transformers 26, the voltage induced in the secondary coil 36 thereof will be at a maximum in the opposite direction or 180° out of phase with the voltage generated in coil 34. Hence with this arrangement, when the gap 62 between the displaced poles 42 and 44 (Fig. 1) is positioned symmetrically adjacent the core 28 of one of the transformers 26, by appropriate rotation of the rotor 24, the voltages induced in the secondary coils 34 and 36 will be equal and opposite in sense and therefore the net secondary output of the transformer in question will be essentially zero.

Upon consideration of the foregoing, it will be apparent that the alternating voltages in the secondaries 34 and 36 of each transformer 26 will be modulated successively as the rotor 24 is rotated by suitable connection thereof to the device whose operation is being telemetered. Due to the structural arrangement of the rotor and its salient poles, the amplitude of the aforesaid modulated voltages will have substantially a sine wave configuration. In this example of the invention, the transformers 26 are equally spaced about the periphery of the rotor 24 with the result that a typical three-phase alternating voltage output is attained by the synchro-transmitter. As stated heretofore, this output is fed into the Y-connected stator windings 52, in one application of the invention, of a conventional synchro-receiver 53 where a rotating field is produced therein in the well-known manner.

Figure 6:
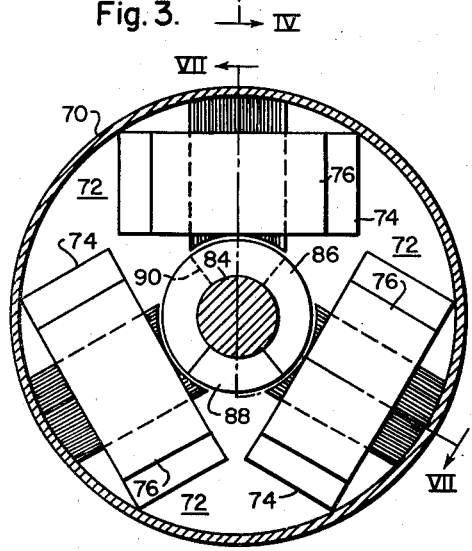
Fig. 6 is a transversely sectional view of a synchroreceiver constructed according to the invention.
Figure 7:
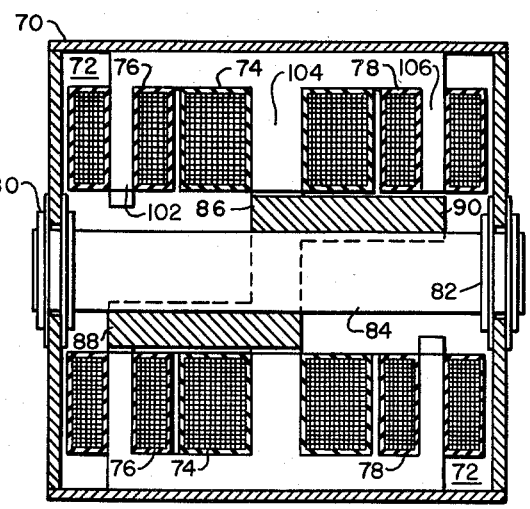
Fig. 7 is a longitudinally sectional view taken along lines VII–VII of Fig. 6.

Alternatively, the output of the transmitter of Figs. 1 and 2 can be coupled to the synchro-receiver illustrated in Figs. 6 and 7 of the drawings, in a manner explained hereinafter. This synchro-receiver is essentially similar in construction to that of the synchro-transmitter of Figs. 1 and 2 of the drawings and comprises a housing 70 about the inner periphery of which are secured a plurality of E-core transformers 72, with each having a primary coil 74, which is of relatively smaller impedance than that of the transmitting primaries 30, and secondary coils 76 and 78. Supported within the housing 70 by suitable bearing collars 80 and 82 secured to the housing 70 is a synchro-receiving rotor 84 fabricated from a non-magnetic material. A magnetic sleeve 86 is rigidly secured to the rotor 84 and is provided with oppositely extending poles 88 and 90 formed integrally with the sleeve 86. The salient poles 88 and 90 are displaced 180° radially of the rotor 84 and are so disposed along the length thereof as to bridge successively the respective gaps in the magnetic circuit between the primary coils 74 and the secondaries 76 and 78 of each of the transformers 72, in a manner described heretofore in connection with Figs. 1 and 2 of the drawings. Alternatively, the salient poles 88 and 90 can be formed separately in a manner shown in connection with the poles 42 and 44 of the synchro-transmitting rotor illustrated in Figs. 1 and 2 of the drawings.

Figure 8:
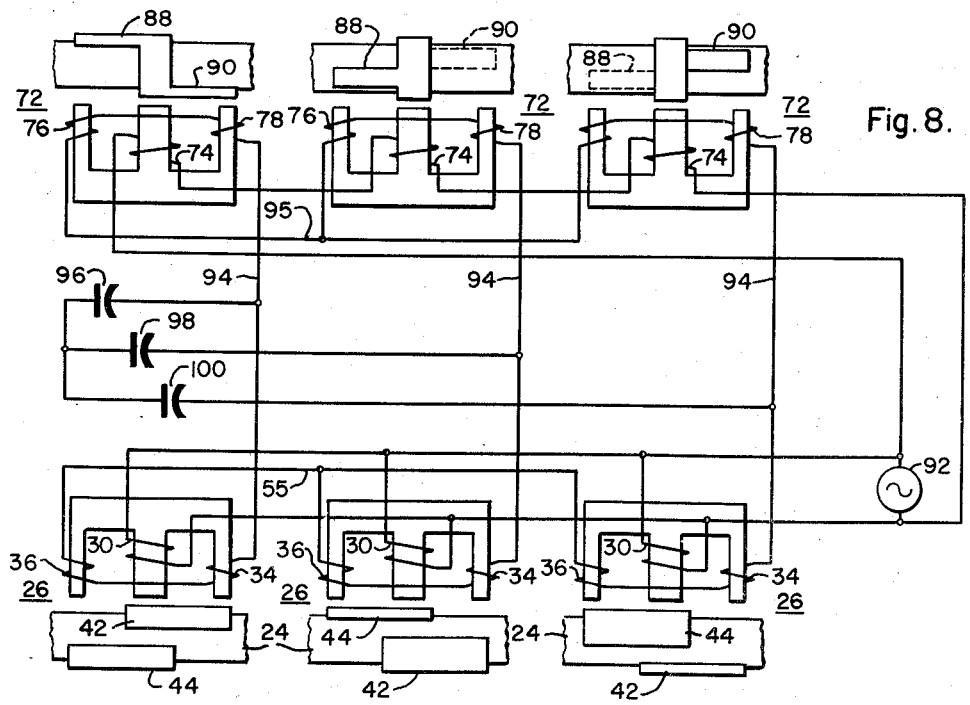
Fig. 8 is a schematic circuit diagram of another synchro-telemetering system, with the broken rotor portions likewise showing positional variations of the rotor poles.

As better shown in Fig. 8 of the drawings, the primaries 74 of the transformers 72 are connected in series to a source of alternating potential 92. In this example a series connection of the primaries 74 is employed inasmuch as they are of less impedance than that of the transmitting primaries 30 in order to reduce the voltages induced locally at the receiving stator within the secondary windings 76 and 78 thereof. The secondary coils 76 and 78 are connected in series-opposition with one another and their inputs are combined into a Y-network, by means of conductors 94 and a common conductor 95, for coupling respectively to the outputs of the series-oppositional, secondary coils 34 and 36 of the synchro-transmitter via the conductors 94. As noted heretofore in connection with Fig. 5 of the drawings, a series of three Y-connected condensers 96, 98 and 100 are coupled across the conductors 94 in order to reduce the inductive load of the telemetering system.

For operation of the invention, reference is made particularly to the telemetering system schematically illustrated in Fig. 8 of the drawings. Upon rotation of the synchro-transmitting rotor 24 the voltages induced in the secondary coils 34 and 36 of the transformers 26 are modulated, as described heretofore in connection with Fig. 5 of the drawings, upon the successive bridging of the magnetic gaps thereof by the salient rotor poles 42 and 44. The differential output from each pair of secondaries 34 and 36 is transmitted, by way of the conductors 94, respectively, to the series-oppositional secondary coils 76 and 78 of the receiving stator comprising the transformers 72. Since the pair of secondary windings 76 and 78 of each of the transformers 72 of the synchro-receiver are wound in opposition, that portion of the signal received in these secondary windings from the respective secondary coils 34 and 36 of the transmitter will operate to form three poles at the legs of each E-transformer 72, with the central leg and one of the outer legs being of opposite polarity, at any one instant, as determined by that of the primary winding 74 which is energized by the external source 92.

As a result of the secondaries 76 and 78 of each receiving transformer having been connected in series-opposition, the magnetic flux inducted by one of the secondary coils therefore will oppose that induced by the separately excited primary coil 74, while that induced by the other of the secondaries will reenforce the primary flux. Thus the outer legs of each receiving transformer will be opposite in polarity. An exception occurs when the poles of one of the transmitting transformers 26 are substantially equally bridged, as when the gap 62 (Fig. 1) of the transmitting rotor 24 is arranged symmetrically adjacent thereto, and the net output of the associated secondary windings 34 and 36 is then in the neighborhood of zero. As indicated previously, the resultant voltages induced locally in the secondary windings 76 and 78 of the receiving stator by the associated primary windings 74 is of relatively lesser magnitude that that of the secondaries 34 and 36. Furthermore, the capacitive network 96, 98, 100 is selected to reduce substantially the inductive loading of the receiving secondary windings 76 and 78, as seen by the voltages induced in the transmitting secondary coils 34 and 36, but not necessarily the inductive loading of these latter coils as seen by the voltages induced locally in the receiving secondary windings 76 and 78.

Whether the secondary winding 76 or 78 of each receiving transformer 72 reenforces the primary winding thereof, depends on whether the position of the transmitting rotor 24 is such that its salient pole 42 or 44 is more effective in bridging the associated magnetic gap of the respective transmitting transformer 26. Thus the reenforcing flux of the secondary winding 76, for an example, will successively reach a maximum value in each of receiving transformers 72 as the transmitting rotor is rotated and the pole 42 thereof successively bridges the poles 32 and 38 of each transmitting transformer. This follows from the fact, in this example, that the secondaries 34 and 76 are wound in the same relative direction, and that the respective primaries 30 and 74 are coupled to the common alternating source 92.

Similarly, the reenforcing flux of each secondary winding 78 will successively reach a maximum value in the associated receiving transformer 72, but will be 180 electrical degrees out of phase with the successive maximum reenforcements engendered by the secondaries 76. This stems from the facts that the secondaries 36 and 78 are wound in the same relative direction but are coupled each in opposition, respectively, to the secondaries 34 and 76, and that the transmitting rotor pole 44, which bridges the transmitting transformer poles 32 and 40, is 180 degrees radially removed from the pole 42.

Thus a pair of rotating fields, as it were, but separated by 180 electrical degrees, are induced in the stator of the receiver in accordance with the rotation of the transmitting rotor 24. The salient pole 88 or 90 of the receiving rotor 84 is attracted to successive positions of bridging relationship with the E-transformers 72 depending upon whether the flux of the secondary winding 76 or 78, respectively, of each transformer is reenforcing that of the primary winding 74 thereof. It follows, then, that when legs 102 and 104 (Fig. 7) of one of the receiving transformers 72 are of opposite polarity the receiving rotor salient pole 88 will be attracted toward gap-bridging relationship therewith, and that when legs 104 and 106 of one of the receiving transformers are of opposite polarity the receiving rotor pole 90 will be attracted toward gap-bridging relationship with the latter-mentioned legs.

As the fields move around the receiving stator, which comprises the transformers 72, the receiving rotor 84 is rotated by the aforesaid pair of fields in synchronization with the transmitting rotor 24. Since the rotor 84 thus is positioned positively by the distribution of the maxima of the rotating field among the transformers 72, the receiving rotor 84 will remain in perfect synchronization with the transmitting rotor 24 despite the speed or the acceleration of the latter.

From the foregoing it will be apparent that novel and efficient telemetering systems have been disclosed. The systems are adaptable for employment in many varied applications wherein synchronized indications are handled in connection with telemetering or servo-systems. In other applications of the invention, components of the disclosed systems are readily adaptable for use within sealed systems or for operation in conjunction with conventional synchro-telemetering devices.

Therefore, numerous modifications will occur to those skilled in the art without departing from the scope of the appended claims. For an example, the dynamo-electric devices disclosed herein are readily adaptable for operation with direct current, or for operation as an electric motor, or the like. Furthermore, it is to be understood that certain features of the invention can be utilized without a corresponding use of other features.

We claim as our invention:

1. In a dynamoelectric device, the combination comprising a rotor; means for supporting said rotor and for rotating said rotor in conformity with a varying characteristic; a pair of salient poles arranged on said rotor, said poles being displaced axially along the length thereof; a plurality of E-core transformers mounted adjacent said rotor, said transformers being spaced about the periphery of said rotor to form a stator for said rotor and having the legs thereof in magnetic gap-bridgeable relationship with said salient poles, respectively; circuit means for coupling the primary winding of each of said transformers to a source of electric potential; and circuit means for coupling the secondary windings of each of said transformers in series-oppositional relationship and for coupling the outputs of said secondary windings to a load device.

2. In a dynamoelectric device, the combination comprising a rotor; means for supporting said rotor and for rotating said rotor in conformity with a varying characteristic; a pair of salient poles mounted on said rotor, said poles being displaced axially along the length thereof and being displaced 180° radially of said rotor; a plurality of E-core transformers mounted adjacent said rotor, said transformers being spaced about the periphery of said rotor to form a stator for said rotor and having the legs thereof in magnetic gap-bridgeable relationship with said salient poles, respectively; circuit means for coupling the primary winding of each of said transformers to a source of electric potential; and circuit means for coupling the secondary windings of each of said transformers to a load device.

3. In a dynamoelectric device, the combination comprising a rotor; means for supporting said rotor and for rotating said rotor in conformity to a varying characteristic; a pair of salient poles mounted on said rotor, said poles being displaced axially along the length thereof; three E-core transformers mounted adjacent said rotor and disposed at positions equally spaced about the periphery of said rotor, said transformers being spaced about the periphery of said rotor to form a stator for said rotor and having the legs thereof in magnetic gap-bridgeable relationship with said salient poles respectively; circuit means for coupling the primary winding of each of said transformers to a source of electric potential; and circuit means for coupling the secondary windings of each of said transformers to a load device.

4. In a dynamoelectric device adapted for use in conjunction with a sealed system, the combination comprising a rotor; a sealed casing enclosing said rotor; means for supporting said rotor and for rotating said rotor in conformity with a varying characteristic; a pair of salient poles mounted on said rotor, said poles being displaced axially along the length thereof; a plurality of E-core transformers mounted adjacent said rotor, said transformers being spaced about the periphery of said rotor to form a stator for said rotor and having the legs thereof in magnetic gap-bridgeable relationship with said salient poles, respectively; circuit means for coupling the primary winding of each of said transformers to a source of electric potential; and circuit means for coupling the secondary windings of each of said transformers to a load device.

5. In a dynamoelectric device adapted for use in conjunction with a sealed system, the combination comprising a rotor; a sealed casing enclosing said rotor; means for supporting said rotor and for rotating said rotor in conformity with a varying characteristic; a pair of salient poles mounted on said rotor, said poles being displaced axially along the length thereof; a plurality of E-core transformers mounted adjacent said rotor; said transformers being spaced about the periphery of said rotor to form a stator for said rotor and having the legs thereof in gap-bridgeable relationship with said salient poles, respectively; a plurality of magnetic inserts secured in the wall of said casing and disposed adjacent the end faces of said legs; circuit means for coupling the primary winding of each of said transformers to a source of electric potential; and circuit means for coupling the secondary windings of each of said transformers to a load device.

6. In a dynamoelectric device adapted for use in conjunction with a sealed system, the combination comprising a rotor; a sealed casing enclosing said rotor; means for supporting said rotor and for rotating said rotor in conformity with a varying characteristic; a pair of salient poles mounted on said rotor, said poles being displaced axially along the length thereof; a plurality of E-core transformers mounted adjacent said rotor, said transformers being spaced about the periphery of said rotor to form a stator for said rotor and each having the legs thereof in magnetic gap-bridgeable relationship with said salient poles, respectively; a magnetic ring member sealed in the wall of said sealed casing and being disposed adjacent the central legs of said transformers; a plurality of magnetic inserts secured in the wall of said casing and disposed adjacent the end faces of the outer legs of said transformers; circuit means for coupling the primary winding of each of said transformers to a source of electric potential; and circuit means for coupling the secondary windings of each of said transformers to a load device.

7. In a dynamoelectric device, the combination comprising a rotor; means for supporting said rotor for rotational movement thereof; a pair of salient poles disposed on said rotor and displaced axially thereof; a plurality of E-core transformers supported adjacent the periphery of said rotor, said transformers being spaced about the periphery of said rotor to form a stator for said rotor and each having the legs thereof in magnetic gap-bridgeable relationship with said salient poles, respectively; circuit means for coupling the primary winding of each of said transformers to a source of electric potential; circuit means for coupling the secondary windings of each of said transformers in series-oppositional relationship and for coupling said secondary windings, respectively, to an electrical generating device having a multiphasal output.

8. In a dynamoelectric device, the combination comprising a rotor; means for supporting said rotor for rotational movement thereof; a pair of salient poles disposed on said rotor, said poles being displaced axially along the length thereof and being displaced 180° radially of said rotor; three E-core transformers mounted adjacent the periphery of said rotor and being displaced 120° about the periphery of said rotor, said transformers being spaced about the periphery of said rotor to form a stator for said rotor and having the legs thereof in magnetic gap-bridgeable relationship with said salient poles, respectively; circuit means for coupling the primary winding of each of said transformers to a source of electric potential; and circuit means coupling the secondary windings of each of said transformers in series-oppositional relationship and for coupling said secondary windings respectively to a three-phasal output of an electrical generating device.

9. A telemetering system comprising a transmitting device including a rotor, means for supporting said rotor and for rotating said rotor in conformity with a varying characteristic, a pair of salient poles secured to said rotor and displaced axially along the length thereof, and a plurality of E-core transformers mounted adjacent to said rotor and being spaced about the periphery thereof to form a stator for said rotor; a receiving device including a rotor, means for mounting said rotor for rotational movement thereof, a pair of salient poles secured to said rotor and displaced axially along the length thereof, a plurality of E-core transformers corresponding in number to said first-mentioned transformers, said second-mentioned transformers being spaced about the periphery of said second-mentioned rotor to form a stator for the second-mentioned rotor; and means for mounting said transformers adjacent said rotor at positions disposed about the periphery thereof; circuit means for coupling the primary winding of each of said first- and second-mentioned transformers to a source of electrical potential; and circuit means for coupling the secondary windings of each of said first- and second-mentioned transformers in series-oppositional relationship and for coupling the secondary windings of said first-mentioned transformers to the secondary windings of said second-mentioned transformers.

10. A telemetering system comprising a transmitting device including a rotor, means for supporting said rotor and for rotating said rotor in conformity with a varying characteristic, a pair of salient poles secured to said rotor and displaced axially along the length thereof, and a plurality of E-core transformers mounted adjacent to said rotor and being spaced about the periphery thereof to form a stator for said rotor; a receiving device including a rotor, means for mounting said rotor for rotational movement thereof, a pair of salient poles secured to said rotor and displaced axially along the length thereof, a plurality of E-core transformers corresponding in number to said first-mentioned transformers, said second-mentioned transformers being spaced about the periphery of said second-mentioned rotor to form a stator for the second-mentioned rotor, and means for mounting said transformers adjacent said rotor at positions disposed about the periphery thereof; circuit means for coupling the primary winding of each of said first- and second-mentioned transformers to a source of electrical potential; and circuit means for coupling the secondary windings of said first-mentioned transformers to the secondary windings of said second-mentioned transformers.

11. In a dynamoelectric device, the combination comprising a rotor; means for supporting said rotor for rotational movement thereof; a pair of salient poles disposed on said rotor and displaced axially along the length thereof; a plurality of E-core transformers supported adjacent the periphery of said rotor, said transformers being spaced about the periphery of said rotor to form a stator for said rotor and each having the legs thereof in magnetic gap-bridgeable relationship with said salient poles, respectively; circuit means for coupling the primary winding of each of said transformers to a first source of electric potential; and circuit means for coupling the secondary windings of said transformers to a second source of electric potential which is modulated in accordance with a varying characteristic, whereby said rotor is positioned in accordance with the interaction between said first and said second voltage sources.

12. In a dynamoelectric device, the combination comprising a rotor; means for supporting said rotor and for rotating said rotor in conformity with a varying characteristic; a pair of salient poles arranged on said rotor, said poles being displaced axially along the length thereof; a plurality of E-core transformers mounted adjacent said rotor, said transformers being spaced about the periphery of said rotor to form a stator for said rotor and having the legs thereof in magnetic gap-bridgeable relationship with said salient poles respectively; circuit means for coupling the primary winding of each of said transformers to a source of electric potential; and circuit means for coupling the secondary windings of each of said transformers to a load device.

13. In a dynamoelectric device, the combination comprising a rotor; means for supporting said rotor and for rotating said rotor in conformity with a varying characteristic; a pair of salient poles mounted on said rotor, said poles being displaced axially along the length thereof; a plurality of E-core transformers mounted adjacent said rotor, said transformers being spaced about the periphery of said rotor to form a stator for said rotor and having the legs thereof in magnetic gap-bridgeable relationship with said salient poles, respectively; circuit means for coupling the primary windings of each of said transformers to a source of electric potential; and additional circuit means for coupling the outputs of said secondary windings to a load device.

References Cited in the file of this patent

UNITED STATES PATENTS

| | | |
|---|---|---|
| 2,517,556 | Goertz | Aug. 8, 1950 |
| 2,553,560 | Esval | May 22, 1951 |